(12) United States Patent
Moss et al.

(10) Patent No.: US 6,341,876 B1
(45) Date of Patent: Jan. 29, 2002

(54) ILLUMINATION SYSTEM

(75) Inventors: Graham Harry Moss, Oldham; Steven James Chapman, Lancs, both of (GB)

(73) Assignee: Digital Projection Limited, Manchester (GB)

( * ) Notice: Subject to any disclaimer, the term of this patent is extended or adjusted under 35 U.S.C. 154(b) by 0 days.

(21) Appl. No.: 09/355,970

(22) PCT Filed: Feb. 19, 1998

(86) PCT No.: PCT/GB98/00523

§ 371 Date: Oct. 21, 1999

§ 102(e) Date: Oct. 21, 1999

(87) PCT Pub. No.: WO98/37448

PCT Pub. Date: Aug. 27, 1998

(30) Foreign Application Priority Data

Feb. 19, 1997 (GB) ............................................. 9703395
Nov. 4, 1997 (GB) ............................................. 9723310

(51) Int. Cl.⁷ ............................................. F21V 13/14
(52) U.S. Cl. ...................... 362/268; 362/293; 362/331; 362/243; 362/551
(58) Field of Search ................. 362/268, 331, 362/293, 242, 243, 326, 327, 551; 359/618, 625, 626, 640

(56) References Cited

U.S. PATENT DOCUMENTS

| | | | |
|---|---|---|---|
| 4,745,293 A | 5/1988 | Christensen | 250/577 |
| 5,059,013 A | 10/1991 | Jain | 359/503 |
| 5,217,285 A * | 6/1993 | Sopori | 362/1 |
| 5,285,509 A | 2/1994 | Reeder et al. | 385/33 |
| 5,923,475 A * | 7/1999 | Kurtz et al. | 359/619 |
| 5,954,424 A * | 9/1999 | Anderson et al. | 362/268 |
| 5,997,150 A * | 12/1999 | Anderson et al. | 362/268 |

FOREIGN PATENT DOCUMENTS

| | | |
|---|---|---|
| EP | 0 227 504 | 8/1988 |
| EP | 0 493 365 | 7/1992 |
| GB | 1117149 | 6/1968 |
| GB | 1 543 327 | 4/1979 |
| JP | 8-271849 | 10/1996 |
| WO | WO 91/04829 | 4/1991 |

OTHER PUBLICATIONS

Daniel H. Raguin, et al., Critical Reviews of Optical Science and Technology, vol. CR49, pp. 234–261, "Subwavelength Structured Surfaces and Their Applications", Jul. 12–13, 1993.

* cited by examiner

Primary Examiner—Alan Cariaso
(74) Attorney, Agent, or Firm—Michael J. Turton, Esq.; Dean W. Russell, Esq.; Kilpatrick Stockton LLP

(57) ABSTRACT

An illumination system for illuminating a spatial light modulator. An integrator rod is positioned in the light path between an arc lamp and the spatial light modulator. At the input surface of the integrated rod, there is positioned a field lens for defocusing areas of turbulence within the arc lamp. In the output surface of the integrated rod there is positioned a plate effective to prevent dust from being attracted to the output surface of the integrator rod. The integrator rod is effective to combine light from two separate light sources.

24 Claims, 5 Drawing Sheets

UNIFORM ILLUMINATION

IMAGE OF TURBULENT REGION
TURBULENT REGION

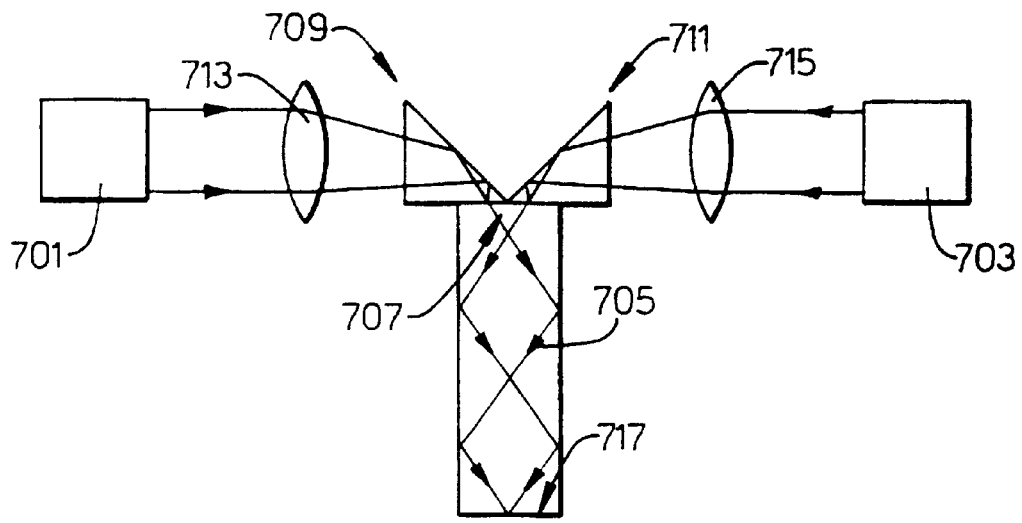
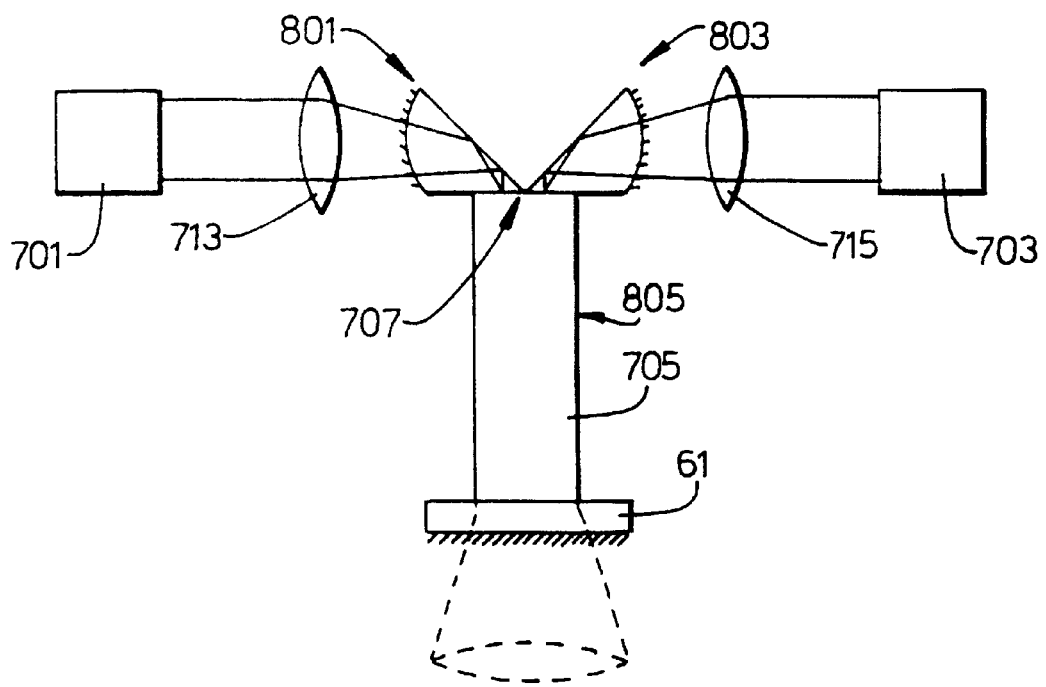

ILLUMINATION SYSTEM

BACKGROUND OF THE INVENTION

1. Field of the Invention

This invention relates to illumination systems. In particular the invention relates to illumination systems for producing a beam of light for illuminating a spatial light modulator, the spatial light modulator producing a spatially modulated beam of light which may be projected onto a display screen.

2. Discussion of the Background

The spatial light modulator may take the form, for example, of a digital micromirror device also known as a deformable or deflectable mirror device (DMD). Digital micromirror devices comprise an array of deflectable mirror elements, each mirror element being mounted on a torsion element over a control electrode. Applying an electric field between each mirror element and the associated control electrode causes the mirror element to pivot. Thus the direction of light reflected from each mirror element may be changed by application of suitable electrical address signals to the digital micromirror device, the electrical address signals usually being derived from an input video signal. In particular, each mirror element may be caused to reflect light either in an "on" direction towards a projector lens for projection onto a display screen, or in an "off" direction towards a beam dump. It is thus possible to spatially modulate a beam of light directed onto the array of mirror elements, the beam being projected onto a display screen so as to produce a projected image. The pixels of the image displayed on the display screen will be derived from one or more of the mirror elements of the digital micromirror device.

In order to provide a sufficiently intense light beam to address such a digital micromirror device, an arc lamp arranged to provide a substantially parallel output beam has been used as the light source. One example of such an arc lamp is described in our co-pending European Patent Application EP-A-0646284.

As a projection apparatus incorporating a pixellated spatial light modulator such as a digital micromirror device requires very uniform illumination across the array of deflectable mirror elements, it is known to incorporate an integrator rod, also known as a light pipe, in the light path between the light source and the array.

The operation of an integrator rod for producing a uniform beam for illuminating a spatial light modulator such as a digital micromirror device is illustrated schematically in FIG. 1.

In FIG. 1, a light source, for example the arc produced by an arc lamp is represented by the triangle labelled 1. A condenser lens 3 is effective to form an inverted image of the light source 1 onto the input surface 5 of a glass integrator rod 7 of a rectangular cross section.

Light entering the rod 7 will propagate through the rod by means of multiple reflections from the internal surfaces of the rod 7. The number of reflections which the light inside the rod 7 undergoes will depend on the angle of incidence of the light on the input surface 5 of the rod 7 and the length of the rod. An even number of internal reflections of the input light inside the integrator rod 7 will produce an inverted image of the light source 1 in the plane of the input surface 5. An odd number of internal reflections of the input light inside the integrator rod 7 will produce a non-inverted image of the light source 1 in the plane of the input surface 5. Thus a large number of both even and odd reflections will lead to multiple images of the source in the plane of the input surface 5 of integrator rod 7, where the orientation of each image is determined by the number of reflections. This effectively transforms the original non-uniform distribution of light at the input surface 5 of integrator rod 7 into a more uniform light distribution at the output surface 9 of the integrator rod 7.

The integrator rod 7 will also be effective to create an output beam of a cross-sectional aspect ratio matched to the output face of the integrator rod 7. This is particularly beneficial in a projection apparatus incorporating a digital micromirror device as the circular cross-section beam produced by, for example, an arc lamp will be converted into a rectangular cross-section beam which may be designed to match the aspect ratio of the digital micromirror device.

A more detailed explanation of the use of an integrator rod in an illumination system is given in "Modern Optical Engineering" by Warren J Smith, published by McGraw-Hill Book Company, 1990; pages 263 to 265.

Whilst the use of an integrator rod is particularly beneficial in a projection apparatus incorporating a digital micromirror device, the introduction of the integrator rod into the light path between the light source and the digital micromirror device may itself create optical aberrations in the beam which illuminates the digital micromirror device. In particular, flicker in the light beam produced in the arc lamp 1 caused by turbulent movement of the gas within the arc lamp may be focused close to the output surface 9 of the integrator rod 7, and appear in the projected image.

Furthermore, any dust appearing on the output face of the integrator rod will be focused by the projector lens on to the display screen.

SUMMARY OF THE INVENTION

It is an object of the present invention to provide an illumination system suitable for illuminating a spatial light modulator wherein the above disadvantages may be avoided, together with an optical component for use in such a system.

It is in some circumstances necessary to use two separate light sources to address a spatial light modulator. EP-A-0704737 discloses an illumination system for a deformable mirror device in which two separate light sources are used to illuminate a digital micromirror device. This enables light of two different colours to be alternately directed to the digital micromirror device. However, such an arrangement will suffer the disadvantage that any spatial irregularities in the beam produced by either of the two individual light sources will be projected directly onto the digital micromirror device.

It is a further object of the present invention to provide an illumination system for a spatial light modulator which may include more than one light source.

According to a first aspect of the present invention there is provide an illumination system for a spatial light modulator including a light source, means for imaging an image of the light source onto the input surface of an integrator rod, and a field lens interposed between the imaging means and the input face of the integrator rod, the field lens being effective to focus an image of turbulent light within the light source away from the output face of the integrator rod.

According to a second aspect of the present invention there is provided an illumination system for a spatial light modulator including an integrator rod interposed in the light path between a light source and the spatial light modulator, a protective transmissive layer being positioned at the output surface of the integrator rod.

According to a third aspect of the present invention there is provided an illumination system for a spatial light modulator including at least two light sources, an integrator rod, and means in respect of each light source effective to couple light from the respective light source into the integrator rod.

According to a fourth aspect of the present invention there is provided an illumination system for a spatial light modulator wherein at least one of the optical components is formed with a diffractive surface effective to cause light within unwanted wavelength bands to be removed from the light incident on the spatial light modulator.

According to a fifth aspect of the present invention there is provided a projection device for use in a projection system including an illumination system in accordance with any one or any combination of the first four aspects of the invention.

According to a sixth aspect of the present invention there is provided an optical component including an integrator rod modified for use in an illumination system in accordance with any one or any combination of the first four aspects of the invention.

BRIEF DESCRIPTION OF THE DRAWINGS

A number of embodiments of the invention will now be described, by way of example only, with reference to the accompanying drawings in which:

FIG. 7 illustrates an integrator rod for use in a third embodiment of the invention;

FIG. 9 is a schematic illustration of a fifth embodiment of the invention.

DETAILED DESCRIPTION OF THE PREFERRED EMBODIMENTS

Figure 2:
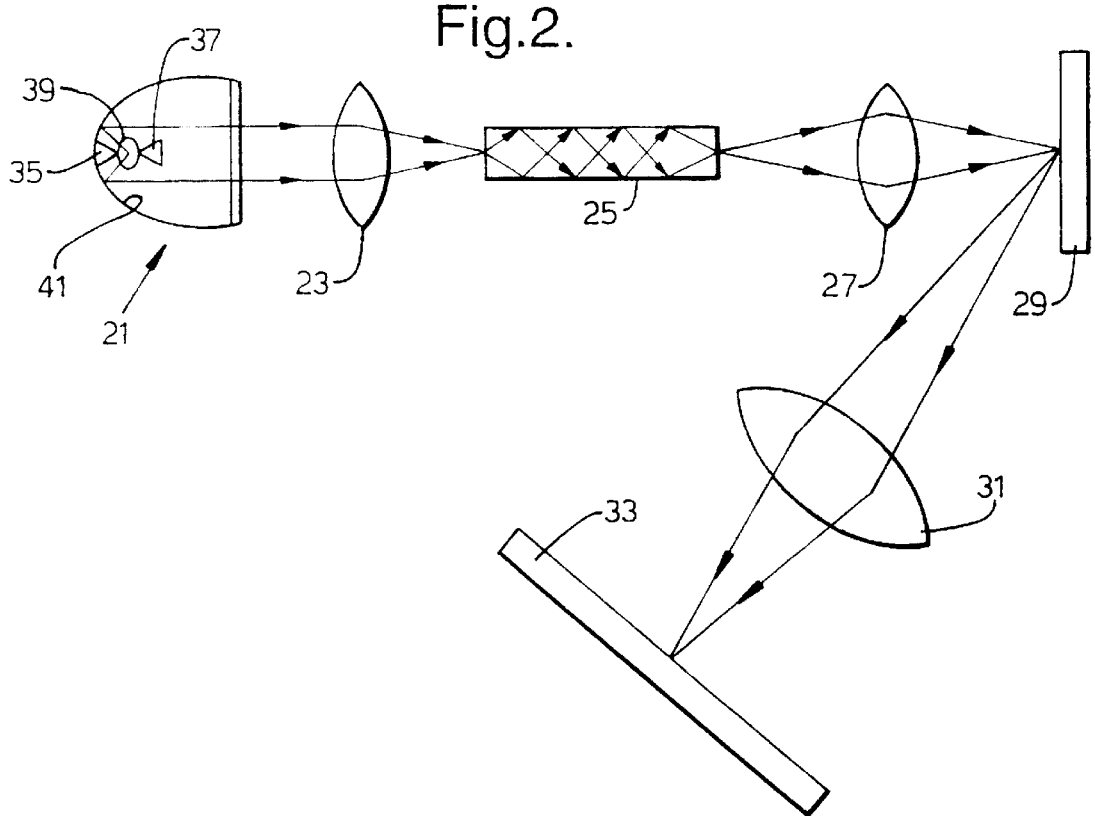
FIG. 2 is a schematic overview of a projection system including a projection apparatus comprising a digital micromirror device and an illumination system for the digital micromirror device.

Referring now to FIG. 2, the projector system to be described comprises a projection apparatus comprising a light source in the form of a sealed beam arc lamp 21, an aspheric condenser lens 23, an integrator rod 25, an achromatic relay lens system 27, a digital micromirror array 29 and a projection lens system 31. The projector system further includes a display screen 33, onto which the projection apparatus is arranged to project an image.

The sealed beam arc lamp 21 comprises a sealed chamber filled with a gas, for example xenon, within which are mounted an anode 35 and a cathode 37. It will be appreciated, however, that the positions of the anode 35 and cathode 37 may be reversed. The anode 35 and cathode 37 between them define an arc gap at which an arc 39 may be struck, the arc gap being positioned at the focal point of an essentially conic reflector 41.

Further details of a suitable arc lamp are given in our co-pending European Application EP-A-0646284.

In operation of the lamp 21, light from the arc 39 is collimated by the conic reflector 41 to produce a substantially parallel output beam.

The substantially parallel output beam from the lamp 21 is focused via the aspheric condenser lens 23 onto the input surface of the integrator rod 5 such that a radial image of the arc is formed at the input surface of the integrator rod 25.

The integrator rod 25 comprises a piece of optically transmissive material, having a rectangular or square cross-section, or is alternately a hollow tube, with reflective surfaces. All the long surfaces of the integrator rod 25 are polished to optically flat surfaces to achieve substantially specular total internal reflection at all the internal surfaces. Alternatively, the walls of the integrator rod 25 are coated with a reflective coating to achieve the required reflectivity. Thus light entering the rod 25 will propagate through the rod by means of multiple internal reflections as described above in relation to FIG. 1.

The length of the integrator rod is constrained by the required size of the projector system, the aspect ratio of the integrator rod, the necessity of minimizing optical losses, and the number of reflections required to attain a uniform intensity distribution at the output face. Any suitable transmissive material with a refractive index greater than the surrounding medium may be chosen for the integrator rod 25. High purity silica is a particularly beneficial material for the integrator rod, as it has a lower refractive index (1.46) than normal glass, thus reducing transmission losses at the reflective surfaces. High purity silica also has superior thermal characteristics when used with high intensity sources. However, glass or other transmissive materials may be used for the integrator rod.

The output of the integrator rod 25 is focussed using an achromatic relay lens system 27 onto the mirror elements of the digital micromirror device 29.

It will be appreciated that whilst only one lens is shown in FIG. 2 to represent the achromatic relay lens system 27, in reality the system 27 will include a number of lenses designed to correct for geometric and chromatic aberrations introduced by the optical components within the projection apparatus.

Each mirror element of the digital micromirror array 29 is effective to produce spatially modulated light by directing the incident light either along an "on" path through a projector lens 31 to the display screen 33, or along an "off" path to a beam dump (not shown). In order to achieve the required angular splitting between the input and output light to the digital micromirror array, a totally internally reflective surface (not shown) effective to transmit either the incoming or reflected light to the mirrors of the digital micromirror device, and to reflect the other of the reflected or incoming light may be interposed in the light paths between the relay lens system 27 and the digital micromirror device 29, and between the digital micromirror device and the projector lens 31. Such an arrangement is described in our International Patent Application No. WO95/22868.

Figure 3:
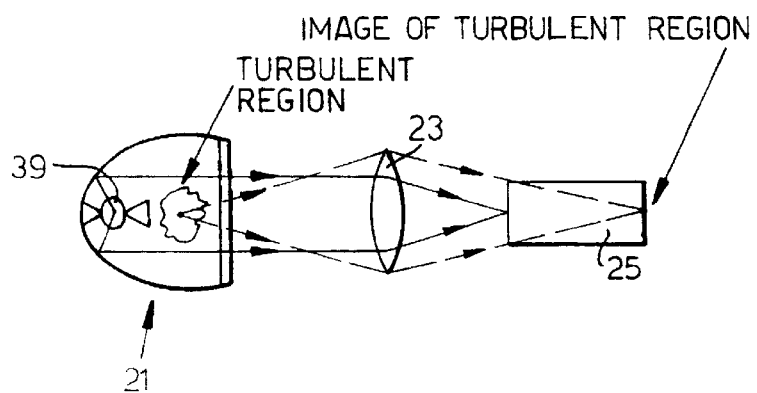
FIG. 3 illustrates the imaging of a turbulent region of the light source on the output surface of the integrator rod in the projection system of FIG. 2.

Referring now also to FIG. 3, this figure illustrates the effect of the turbulent movement of the gas in the arc lamp 21. As the turbulence will cause the light from the arc 39 to be spatially modulated in a continually varying manner within the lamp 21, dependent on the rod length, the positions of the optical components and the focal length of the condenser lens, the condenser lens 23 may cause an image of the scattered light within the turbulent regions of lamp 23 to be formed just within or beyond the output face of the integrator rod 25. The image of the scattered light will be relayed onto the DMD by relay lens system 27, this light being focused by the projector lens 31 onto the display screen 33. Thus a randomly variable intensity light pattern will be superimposed on the integrated image formed at the display screen 33. As the image at the output surface of the integrator rod is projected via the projector lens 31 onto the display screen 33, flicker in the projected image caused by the turbulence within the lamp 21 will be apparent on the display screen.

First Embodiment

In order to overcome the above described problem of the imaging of the turbulent region within the lamp in the displayed image on the display screen 33, in accordance with the first embodiment of the invention, a field lens is positioned at the input face of the integrator rod 25 as shown in FIGS. 4(a) and 4(b). The field lens may be convex on both faces, or planar convex.

Figure 5:
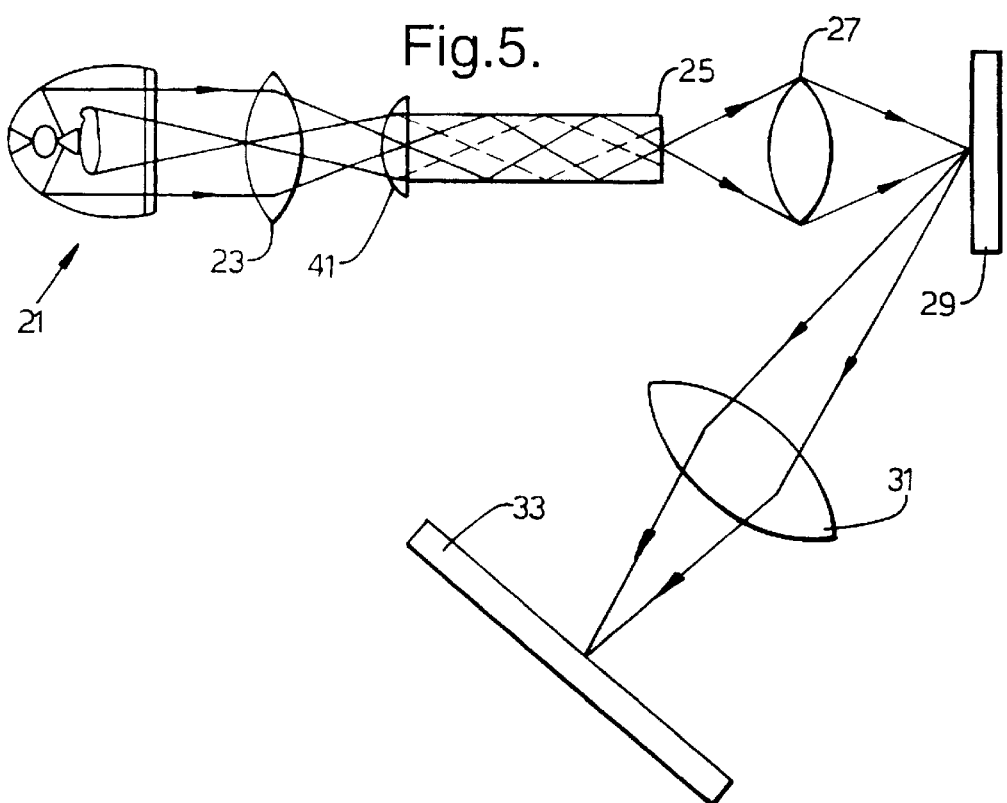
FIG. 5 illustrates the effect of the integrator rods illustrated in FIGS. 4(*a*) and 4(*b*) on an illumination system in accordance with the first embodiment of the invention.

Referring to FIG. 5 the effect of the field lens 41 will be to focus the image of the turbulent regions of the lamp 21 within the integrator rod. Thus light originating from the turbulent regions of the lamp 21, and indicated as a dashed line in FIG. 5, will undergo reflections within the integrator rod 25, thereby cancelling out some of the random fluctuations in the image formed by the turbulence. However, the substantially collimated beam produced from the arc 39 within the lamp 21 after reflection by the conic reflector is focused by the condenser lens 23 onto the input surface of the integrator rod 25. This light will pass essentially through the centre of the field lens 41, and will therefore be undeviated by the field lens 41.

The result of this is that the required superimposed inverted and non-inverted images of the turbulent region of the lamp 21 will be formed at the output of the integrator rod 25 so as to create a uniform illumination beam for the digital micromirror device 29.

Two possible arrangements for the field lens are shown in FIGS. 4(a) and 4(b). In FIG. 4(a) the planar face of a planar convex lens 41 is located at the input surface of the integrator rod 25, and may be fused, optically coupled using a layer of oil of suitable refractive index, or cemented using a suitable optical cement to the input surface of the integrator rod 25. The lens 41 may be separated from the integrator rod along the optical axis though this may not be so optically efficient. Where the integrator rod is a hollow tube, the convex lens will generally take the form of a separate lens as shown in FIG. 4(a).

In a preferred arrangement, as shown in FIG. 4(b) a convex lens 43 is formed integrally with the input surface of the integrator rod, thus avoiding the use of optical cements with the associated optical losses and constraints on thermal loading.

The required curvature of the field lens 41 to produce the required shift of the image of the turbulent regions of the lamp 21 will depend on a number of parameters including the focussing power of the aspheric condenser lens 23, the spacing of the lamp 21 to the aspheric condenser lens 23, the spacing of the aspheric condenser lens 23 to the integrator rod 25, and the refractive index of the integrator rod 21 and field lens 41. The inventors have performed a number of computer simulations varying the various parameters to determine the optimum combination of parameters. In one particular example these parameters have the following values:

Length of integrator rod: 95 mm
Refractive index of integrator rod: 1.45856
Spacing lamp to condenser lens: 155 mm
Spacing condenser lens to rod: 63.7 mm
Curvature condenser lens on lamp side: +0.0233 mm$^{-1}$
Curvature condenser lens on rod side: −0.00762 mm$^{-1}$
Thickness condenser lens: 26.5 mm
Refractive index of condenser lens: 1.516
Radius of curvature input surface of integrator rod: +19.00 mm Where no field lens 41 (or curvature at the input surface of the integrator rod 25) is present, the image of the turbulent region of the lamp is focussed in the region of the output face of the integrator rod 25 leading to the problems discussed above. However, where the input surface of the integrator rod 25 is formed with a convex curvature of +19 mm, the object conjugate corresponding to an image at the exit face of the integrator rod 25 will be shifted to a position between the lamp 21 and the condenser lens 23, at a spacing of approximately 37 mm from the lamp along the optical axis. Thus, as described above, light originating from the turbulent regions of the lamp 21 will undergo reflections within the integrator rod 25, reducing the temporal fluctuations in the light reaching the digital micromirror device 29 originating from the turbulent regions of the lamp.

Second Embodiment

Figure 1:
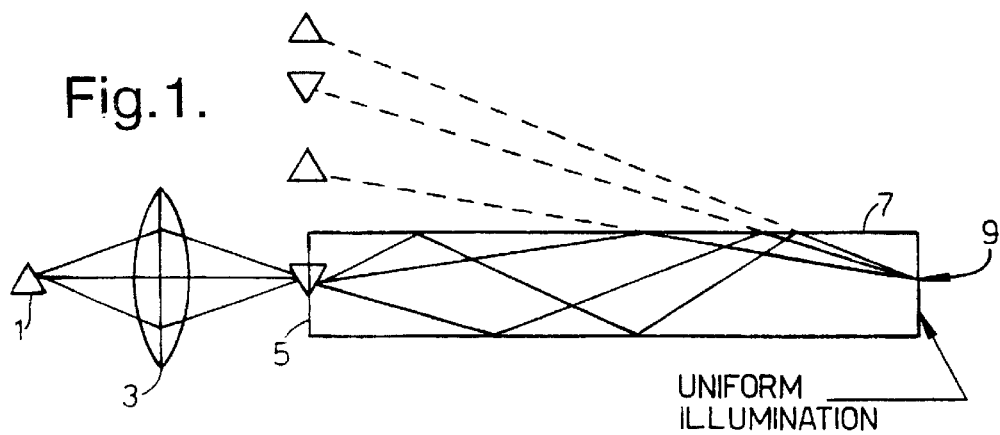
FIG. 1 illustrates the passage of light from a light source through an integrator rod.

A further problem of the system shown in FIG. 1 is that dust or other debris electrostatically or otherwise attracted to the output surface 9 of the integrator rod 7 will be imaged by the achromatic relay lens system and projection lens system onto the display screen. Whilst it may be possible to remove the dust by careful cleaning in dust free environments, this is very time consuming and risks damage to the polished optical surfaces.

Figure 6:
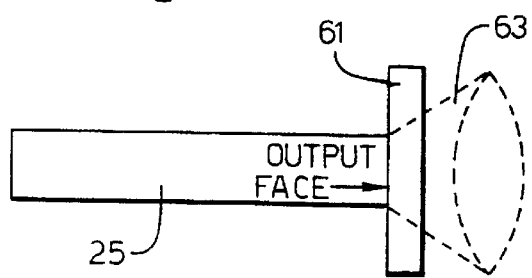
FIG. 6 is a schematic illustration of an integrator rod for use in an illumination system in accordance with a second embodiment of the invention.

Referring now also to FIG. 6, in order to overcome this problem, there is provided at the output surface of the integrator rod 25 a glass plate 61. The thickness of the plate 61, in the direction perpendicular to the output surface of the integrator rod 25, is selected so that the dust, now on the outer surface of plate 61, will be out of focus at the digital micromirror device 29.

In use of the projection system, using the composite integrator rod 25 and glass plate 61, the achromatic relay lens system 27 remains focussed on the output face of the integrator rod 25 to provide a sharp image of the light from the arc lamp at the required format ratio, and with a uniform intensity distribution. Any dust or other debris settling on the free surface of the glass plate 61 will not be at the object conjugate of the achromatic relay lens system 27, and hence will appear out of focus at the digital micromirror device 29 and at the display screen 33.

The lateral dimensions of the plate 61, that is the dimensions of the plate 61 in the plane parallel to the output surface of the integrator rod 25 is chosen to exceed the lateral dimensions of the output surface of the integrator rod 25, in particular to exceed the lateral dimensions of the cone of light 63 emitted from the output face of the integrator rod 25.

The inventors for the present application have performed a number of experiments to determine the optimum dimensions of the glass plate 61. Too great a thickness reduces the light output of the integrator rod, whilst too small a thickness does not produce the required defocussing effect. The inventors have found that a thickness in the region of 3 mm gives a particularly beneficial result.

The glass plate 61 may be either cemented or fused to the output face of the integrator rod in clean conditions during manufacture of the integrator rod 25.

Figure 10:
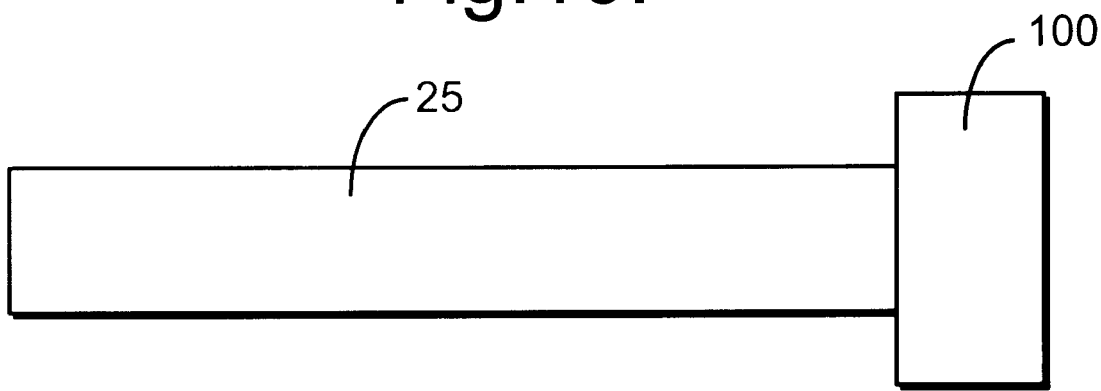
FIG. 10 is a schematic illustration of an integrator rod in accordance with the second embodiment of the invention.

It will be appreciated that whilst a glass plate is described in the above embodiment to protect the output surface of the integrator rod, the protective means could also form an imaging element for the projection system, or a prism member effective to redirect light passing through the integrator rod. This is shown in FIG. 10, where the protective means 100 could be an imaging element or a prism element.

Figure 4:
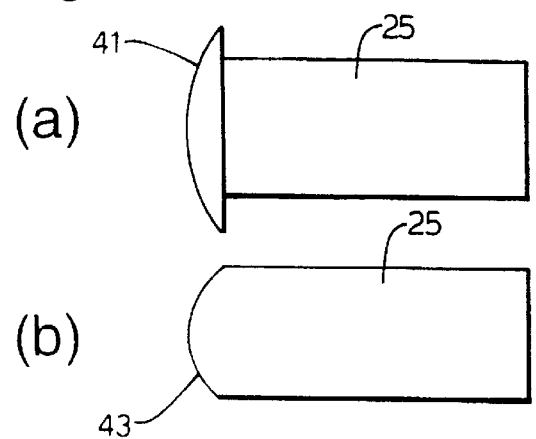
FIGS. 4(*a*) and 4(*b*) are schematic illustrations of two integrator rods for use in an illumination system in accordance with a first embodiment of the invention.

It will be appreciated that the input surface of the integrator rod 25 shown in FIG. 6 may carry a separate or integrated convex lens at the input surface as shown in FIGS. 4(*a*) and 4(*b*).

Third Embodiment

Referring now to FIG. 7, this Figure illustrates the use of an integrator rod to combine the outputs of two separate light sources 701, 703 in order to produce a higher intensity light beam than is possible from a single light source.

Each light source as before suitably takes the form of a sealed beam arc lamp, but may be any other suitable high intensity light source. The integrator rod 705 has, at its input surface 707, two oppositely directed prisms 709, 711. Between each prism 709, 711 and each of the two light sources 701, 703 there is arranged a respective condenser lens 713, 715 arranged to focus the parallel beam of light emitted from the respective light source 701, 703 onto the input face 707 of the integrator rod 705.

The light passing from each light source 701, 703 into each of the prisms 709, 711 will be totally internally reflected by the hypotenuse surface of the respective prism 709, 711 to form respective light spots on the input surface 707 of the integrator rod 705. This light will then be reflected within the integrator rod 705 as before the light from the two light sources being mixed to produce a composite image of light from the two light sources 701, 703 on the output surface 717 of the integrator rod 705. Thus a uniform even illumination field will be produced at the output surface 717 of the integrating rod 705 which combines the light flux from the two sources 701, 703.

It will be appreciated that whilst as described above, light from the two light sources 701, 703 is directed simultaneously onto the input surface of the integrator rod, in some circumstances it may be required that light from each of the light sources 701, 703 be directed sequentially onto the input surface of the integrator rod. This may be the case, for example, where each of the light sources is arranged to direct light of a different colour onto the digital micromirror device to achieve a colour projection apparatus. In such a case it is possible to arrange for light from three or more different sources to be coupled sequentially into the integrator rod. The different sources may be derived from a multiwavelength source such as a xenon arc lamp using a filter arrangement.

Fourth Embodiment

The light output of the sealed beam arc lamp used to illuminate the digital micromirror device will include unwanted light in the ultraviolet and infra-red wavelengths. This is particularly the case where the lamp is filled with xenon which produces a large amount of light in the ultra-violet and infra-red wavelengths. In order to remove this unwanted light from the light illuminating the digital micro-mirror device and thus avoid heating of the digital micromirror device, in accordance with a further aspect of the invention the integrator rod shown in any one of FIGS. 2 to 7 may be formed with a diffractive structured surface along its long edges effective to form a dichroic mirror surface. The dichroic mirror surface is designed such that the required visible light is totally internally reflected within the integrator rod, whilst the unwanted infra-red and ultraviolet light passes out through the long surfaces of the integrator rod to be absorbed by a suitable beam dump (not shown) external to the integrator rod.

Details of such structured diffractive surfaces are given in the following article:

Applied Optics, vol 32, pages 1154–1167 (1993), D.H. Raguin and G.M. Morris, "Anti-reflection structured surfaces for the infrared spectral region".

Figure 8:
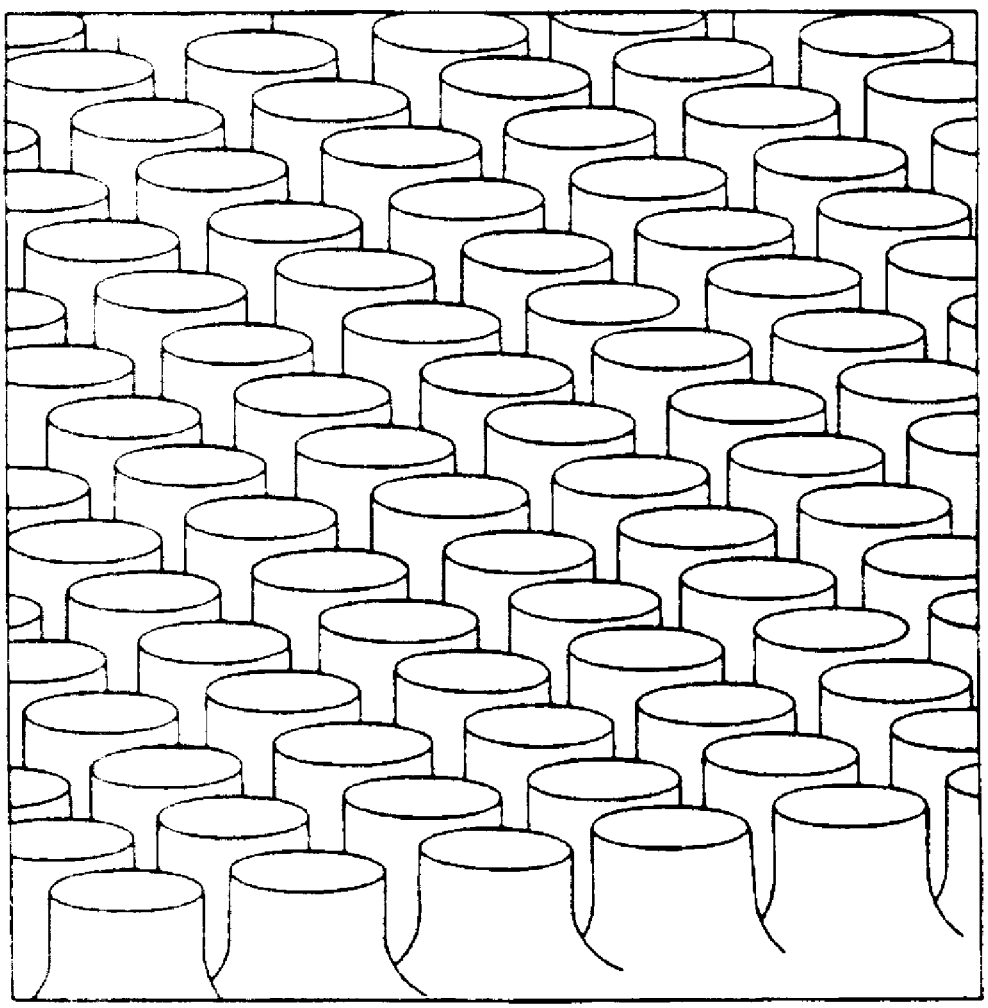
FIG. 8 is a schematic large scale illustration of a structured diffractive surface used in a fourth embodiment of the invention.

In summary, the diffractive surface is a periodically structured surface for example a series of ridges or an array of protuberances produced by holography, with a period typically 2 to 3 times smaller than the wavelength of infra-red light. The grating surface will thus suitably have a period of between 0.2 microns and 2 microns. An example of such a surface is shown in FIG. 8 which shows an array of cylindrical structures formed on the surface of the integrator rod, the structures having the dimensions and spacing chosen to produce the required dichroic effect.

It will be appreciated that the use of the structured diffractive surface is particularly advantageous in a projection apparatus in accordance with the invention, as a dichroic coating produced by for example thin film coating techniques, is likely to peel particularly where heating of the integrator rod occurs due to the high power output beam of the arc lamp.

A structured diffractive surface of the type described above may alternatively or additionally be formed at the input surface (labelled 5 in FIG. 1) of the rod, the lens surfaces 41, 43 shown in FIG. 4, and the outer surfaces 709 and 711 shown in FIG. 7. In such cases, the diffractive surface will be arranged to have a period such that the coating is effective to transmit visible light and to reflect light in the unwanted infra-red and ultraviolet wavelength bands.

Fifth Embodiment

It will be appreciated that whilst embodiments in accordance with each of the aspects of the present invention described above can be used separately to provide an improved projection apparatus, a particularly beneficial apparatus is achieved in the arrangement illustrated in FIG. 9 in which corresponding components to those shown in the earlier figures are correspondingly labelled.

As can be seen from FIG. 9, the input surfaces 801, 803 of the respective prisms 709, 711 are formed to have a convex input face, the convex surfaces 801, 803 being treated in order to reduce reflection losses. These convex input faces act as the lenticular arrangement shown in FIGS. 4(*a*) and 4(*b*) and are effective to cause focussing of the light from the turbulent areas of the light sources 701, 703 within the integrator rod 705 as explained in relation to FIGS. 4 and 5.

At the output surface of the integrator rod 705 there is attached a glass plate equivalent to that shown in FIG. 6 effective to prevent dust being attracted to the surface 717 of the integrator rod 705 in analogous manner to FIG. 6. This plate again may be treated in order to reduce reflection losses.

A diffractive structured surface as described in relation to the fourth embodiment and indicated as 805 in FIG. 9 is formed along the long edges of the integrator rod 705. This coating is designed to remove infra-red and ultraviolet light from the light passing towards the output surface of the integrator rod as described above.

Further Modifications

It will be appreciated that whilst in each of the embodiments described herebefore, an aspheric condenser lens is used to produce an image of the light source on the input surface of the integrator rod, the single lens shown may be replaced by a combination of lenses. Furthermore, the condenser lens may be replaced by a concave reflector positioned so as to produce the required image of the light source on the input surface of the integrator rod. Any of the features disclosed in relation to the embodiments of the invention described above may be incorporated in such a system.

It will also be appreciated that whilst the invention claimed has particular application in an illumination system for a projection apparatus incorporating a spatial light modulator in the form of a digital micromirror device, the invention claimed also finds application in illumination systems for spatial light modulators, in particular other forms of pixellated spatial light modulator systems such as liquid crystal arrays. Whilst digital micromirror devices are reflective devices, and thus the projector lens system and display screen shown in FIG. 2 are positioned accordingly, it will be appreciated that alternative spatial light modulator devices, which are transmissive rather than reflective, such as liquid crystal arrays, may be optically addressed by an illumination system in accordance with the invention.

It will also be appreciated that whilst the invention finds particular application in an illumination system including one or more light sources in the form of an arc lamp arranged to produce a substantially parallel output beam, the invention also finds application in illumination systems incorporating other forms of light sources, for example arc lamps which produce a focused beam, or tungsten lamps.

It will also be appreciated that whilst the embodiments described by way of example include a single digital micromirror device, a colour projection apparatus will often include three digital micromirror devices, each responsive to light within a different primary colour wavelength band, i.e. red, green or blue. Such apparatus will then include a colour splitting means, for example a pair of dichroic mirrors in the light path between the end of the integrator rod and the digital micromirror devices. The spatially modulated light from the three digital micromirror devices will then be combined prior to projection by the projector lens 31. Alternatively, three separate colour sources may be provided, with an integrator rod and other associated optical components being provided in respect of each primary colour channel.

What is claimed is:

1. An illumination system for a projection system including at least one spatial light modulator, the illumination system including:
   an arc lamp;
   means for focussing an image of the arc which in use is produced by the arc lamp onto an input surface of an integrator rod; and
   a field lens at the input surface of the integrator rod;
   the field lens being effective to focus an image of scattered light within the arc lamp at a position within the integrator rod displaced from the output surface of the integrator rod.

2. An illumination system according to claim 1 wherein said imaging means comprises at least one condensing lens.

3. An illumination system according to claim 1 wherein said imaging means comprises a concave reflective surface.

4. An illumination system according to claim 1 wherein said field lens is integral with the integrator rod.

5. An illumination system according to claim 1 wherein said field lens is attached to said integrator rod.

6. An illumination system according to claim 1 wherein said field lens is separate from said integrator rod.

7. An illumination system for a projection system including at least one spatial light modulator, the illumination system including:
   a light source;
   an integrator rod interposed in the light path between the light source and the spatial light modulator;
   focussing means effective to focus the light output from the integrator rod onto the spatial light modulator; and
   a light transmissive protective means at the output surface of the integrator rod effective to transmit light emerging from the integrator rod, the protective means having a thickness such that an image of any debris on the surface of the protective means remote from the integrator rod is not focused on the spatial light modulator.

8. An illumination system according to claim 7 wherein the protective means has a larger area in the direction perpendicular to the optical axis of the integrator rod than the output surface of the integrator rod.

9. An illumination system according to claim 7 in which the protective means is a light transmissive plate.

10. An illumination system according to claim 7 in which the protective means is an imaging element.

11. An illumination system according to claim 7 in which the protective means is a prism element effective to redirect light passing through the integrator rod.

12. An illumination system for a projection system including at least one spatial light modulator including:
   at least two light sources;
   an integrator rod;
   a prism arrangement including a non-spherical surface in respect of each light source effective to reflect light from the respective light source onto the input face of the integrator rod such that the integrator rod produces a beam of substantially uniform illumination from the light incident on the rod at any one time; and
   a focusing lens for each light source effective to focus light from the respective light source onto a respective input surface of the prism arrangement.

13. An illumination system according to claim 12 in which the light sources are arranged to direct light onto the integrator rod simultaneously.

14. An illumination system according to claim 12 in which the light sources are arranged to direct light onto the integrator rod sequentially.

15. An illumination system for a projection system including at least one spatial light modulator, the illumination system including:
   an arc lamp;
   means for focusing an image of the arc which in use is produced by the arc lamp onto an input surface of an integrator rod; and
   a field lens at the input surface of the integrator rod, the field lens being effective to focus an image of scattered light within the arc lamp at a position within the integrator rod displaced from the output surface of the integrator rod,
   wherein at least one of the means for focusing the integrator rod and the field lens is formed with a structured surface constituting a diffractive element effective to reflect light within selected wavelength bands, and transmit light within other wavelength bands.

16. An illumination system for a projection system including at least one spatial light modulator, the illumination system including:

a light source;

an integrator rod interposed in the light path between the light source and the spatial light modulator;

focusing means effective to focus the light output from the integrator rod onto the spatial light modulator; and a light transmissive protective means at the output surface of the integrator rod effective to transmit light emerging from the integrator rod, the protective means having a thickness such that an image of any debris on the surface of the protective means remote from the integrator rod is not focused on the spatial light modulator, wherein at least one of the means for focusing the integrator rod and the light transmissive protective means is formed with a structured surface constituting a diffractive element effective to reflect light within selected wavelength bands, and transmit light within other wavelength bands.

17. An illumination system for a projection system including at least one spatial light modulator including:

at least two light sources;

an integrator rod;

a prism arrangement effective to couple light from each light source onto the input face of the integrator rod such that the integrator rod produces a beam of substantially uniform illumination from the light incident on the rod at any one time; and a focusing lens for each light source effective to focus light from the respective light source onto a respective input surface of the prism arrangement, wherein at least one of the integrator rod, the prism arrangement and the focusing lenses are formed with a structured surface constituting a diffractive element effective to reflect light within selected wavelength bands, and transmit light within other wavelength bands.

18. An illumination system according to any one of claims 15, 16 or 17 in which one of the wavelength bands is a visible wavelength band, and the other wavelength band is at least one of the ultraviolet and infra-red wavelength bands.

19. A projection apparatus for use in a projection system, the projection apparatus including at least one spatial light modulator and an illumination system in accordance with any one of claims 1, 7, 12, 15, 16, or 17 arranged to illuminate the spatial light modulator.

20. A projection apparatus according to claim 19 wherein the spatial light modulator is a digital micromirror device.

21. A projection system comprising a projection apparatus, including at least one spatial light modulator, an illumination system in accordance with any one of claims 1, 7, 12, 15, 16, or 17 arranged to illuminate the spatial light modulator and a projection lens effective to direct spatially modulated light from the spatial light modulator onto a display screen.

22. A projection system comprising a projection apparatus according to claim 19, a projection lens and a display screen, the projection lens being effective to direct spatially modulated light from the spatial light modulator onto the display screen.

23. An illumination system according to claim 12 in which light directed from the two light sources is substantially perpendicular to the length of the integrator rod.

24. A projection system according to claim 21, wherein the spatial light modulator is a digital micromirror device.

* * * * *